US012578849B2

(12) United States Patent
Jiang et al.

(10) Patent No.: US 12,578,849 B2
(45) Date of Patent: Mar. 17, 2026

(54) METHOD, APPARATUS, ELECTRONIC DEVICE AND READABLE STORAGE MEDIUM FOR PAGE PROCESSING

(71) Applicant: Beijing Bytedance Network Technology Co., Ltd., Beijing (CN)

(72) Inventors: Wei Jiang, Beijing (CN); Diang Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 152 days.

(21) Appl. No.: 18/569,940

(22) PCT Filed: Jun. 7, 2022

(86) PCT No.: PCT/CN2022/097301
§ 371 (c)(1),
(2) Date: Dec. 13, 2023

(87) PCT Pub. No.: WO2023/284442
PCT Pub. Date: Jan. 19, 2023

(65) Prior Publication Data
US 2024/0272783 A1 Aug. 15, 2024

(30) Foreign Application Priority Data
Jul. 14, 2021 (CN) .......................... 202110796850.7

(51) Int. Cl.
*G06F 3/04845* (2022.01)
*G06F 3/04886* (2022.01)
*G06T 13/80* (2011.01)

(52) U.S. Cl.
CPC ...... *G06F 3/04845* (2013.01); *G06F 3/04886* (2013.01); *G06T 13/80* (2013.01); *G06F 2203/04806* (2013.01); *G06T 2200/24* (2013.01)

(58) Field of Classification Search
CPC ................. G06T 13/80; G06T 2200/24; G06F 2203/04806; G06F 3/04845; G06F 3/04886
See application file for complete search history.

(56) References Cited

U.S. PATENT DOCUMENTS 9,223,486 B2 * 12/2015 Shin .................... G06F 3/04883
10,795,547 B1 10/2020 Brown et al.
(Continued)

FOREIGN PATENT DOCUMENTS

AU 2014200500 A1 8/2014
CN 102012914 A 4/2011
(Continued)

OTHER PUBLICATIONS

European Search Report for EP Patent Application No. 22841082.5, Issued on Nov. 8, 2024, 9 pages.
(Continued)

*Primary Examiner* — Tadesse Hailu

(57) ABSTRACT

The disclosure provides a method, apparatus, electronic device and readable storage medium for page processing. The method includes: in response to a touch operation on a terminal interface, obtaining touch position information and picture position information of respective pictures in a target dynamic page displayed in the terminal interface; determining a touched target picture and target picture position information based on the touch position information and the picture position information; creating a raw image view component at a target picture position, rendering the target picture based on the raw image view component, and launching a screen touch event interception mechanism; in response to that a touch event for the target picture is intercepted, processing the target picture rendered by the
(Continued)

IN RESPONSE TO A TOUCH OPERATION ON A TERMINAL INTERFACE, OBTAIN TOUCH POSITION INFORMATION AND OBTAIN PICTURE POSITION INFORMATION OF RESPECTIVE PICTURES IN A TARGET DYNAMIC PAGE DISPLAYED IN THE TERMINAL INTERFACE — S101

DETERMINE, BASED ON THE TOUCH POSITION INFORMATION AND THE PICTURE POSITION INFORMATION OF THE RESPECTIVE PICTURES, A TARGET PICTURE BEING TOUCHED AMONG THE RESPECTIVE PICTURES AND TARGET PICTURE POSITION INFORMATION OF THE TARGET PICTURE IN THE TERMINAL INTERFACE — S102

CREATE A RAW IMAGE VIEW COMPONENT AT A TARGET PICTURE POSITION INDICATED BY THE TARGET PICTURE POSITION INFORMATION, RENDER THE TARGET PICTURE BASED ON THE RAW IMAGE VIEW COMPONENT, AND LAUNCH A SCREEN TOUCH EVENT INTERCEPTION MECHANISM — S103

IN RESPONSE TO THAT A TOUCH EVENT FOR THE TARGET PICTURE IS INTERCEPTED, PROCESS THE TARGET PICTURE RENDERED BY THE RAW IMAGE VIEW COMPONENT BASED ON A TOUCH OPERATION INDICATED BY THE TOUCH EVENT OF THE TARGET PICTURE — S104 raw image view component based on a touch operation indicated by the touch event of the target picture.

20 Claims, 4 Drawing Sheets

(56) References Cited

U.S. PATENT DOCUMENTS

| | | | | |
|---|---|---|---|---|
| 11,765,406 | B2 * | 9/2023 | Ramaswamy | ............................... H04N 21/440245 |
| | | | | 386/230 |
| 12,022,359 | B2 * | 6/2024 | Uzum Vella | ......... G01C 21/367 |
| 2010/0002016 | A1 * | 1/2010 | Kim | ...................... G06F 3/0488 |
| | | | | 345/173 |
| 2011/0074710 | A1 * | 3/2011 | Weeldreyer | ........... G06F 3/0481 |
| | | | | 345/173 |
| 2011/0074830 | A1 * | 3/2011 | Rapp | .................... G06F 3/04883 |
| | | | | 345/173 |
| 2016/0004389 | A1 | 1/2016 | Iwatsuki et al. | |
| 2016/0042496 | A1 * | 2/2016 | Ichimi | ....................... G06T 3/40 |
| | | | | 345/671 |
| 2016/0198052 | A1 * | 7/2016 | Shogaki | ............. H04N 1/00392 |
| | | | | 358/1.15 |
| 2017/0109016 | A1 * | 4/2017 | Hachiya | .............. G06F 3/04845 |
| 2017/0286372 | A1 * | 10/2017 | Chellam | ............... G06F 3/0482 |
| 2018/0146132 | A1 * | 5/2018 | Manzari | ............... H04N 23/635 |
| 2019/0028650 | A1 * | 1/2019 | Bernstein | ............... H04N 23/90 |
| 2019/0235722 | A1 | 8/2019 | Wang et al. | |
| 2022/0392159 | A1 * | 12/2022 | Delgado | ............. G06F 3/04842 |

FOREIGN PATENT DOCUMENTS

| | | |
|---|---|---|
| CN | 103279293 A | 9/2013 |
| CN | 104077387 A | 10/2014 |
| CN | 105988702 A | 10/2016 |
| CN | 106406855 A | 2/2017 |
| CN | 106909354 A | 6/2017 |
| CN | 108182021 A | 6/2018 |
| CN | 108280231 A | 7/2018 |
| CN | 110221722 A | 9/2019 |
| CN | 110413913 A | 11/2019 |
| CN | 111459363 A | 7/2020 |
| CN | 111736740 A | 10/2020 |
| CN | 112051952 A | 12/2020 |
| CN | 112053286 A | 12/2020 |
| CN | 112099690 A | 12/2020 |
| CN | 112419137 A | 2/2021 |
| CN | 112578971 A | 3/2021 |
| CN | 112596648 A | 4/2021 |
| CN | 113536173 A | 10/2021 |
| JP | 2012-053623 A | 3/2012 |
| JP | 2013-190982 A | 9/2013 |
| JP | 2013-218375 A | 10/2013 |
| JP | 2014-178882 A | 9/2014 |
| JP | 2015-103086 A | 6/2015 |
| WO | 01/63556 A1 | 8/2001 |

OTHER PUBLICATIONS

Notification to Grant Patent Right for Invention received for Chinese Patent Application No. 202110796850.7, mailed on Dec. 19, 2023, 6 pages (2 pages of English Translation and 4 pages of Original Document).

Office Action received for Japanese Patent Application No. 2023-573551, mailed on Oct. 29, 2024, 10 pages (5 pages of English Translation and 5 pages of Original Document).

Second Office Action received for Chinese Patent Application No. 202110796850.7, mailed on Sep. 20, 2023, 14 pages (7 pages of English Translation and 7 pages of Original Document).

Wang et al., "Step by step with Visual C++ 5.0", Sep. 1998, 9 pages (4 pages of English Translation and 5 pages of Original Document).

First Office Action issued Jun. 7, 2023 in CN Appl. No. 202110796850. 7, English translation (13 pages).

* cited by examiner

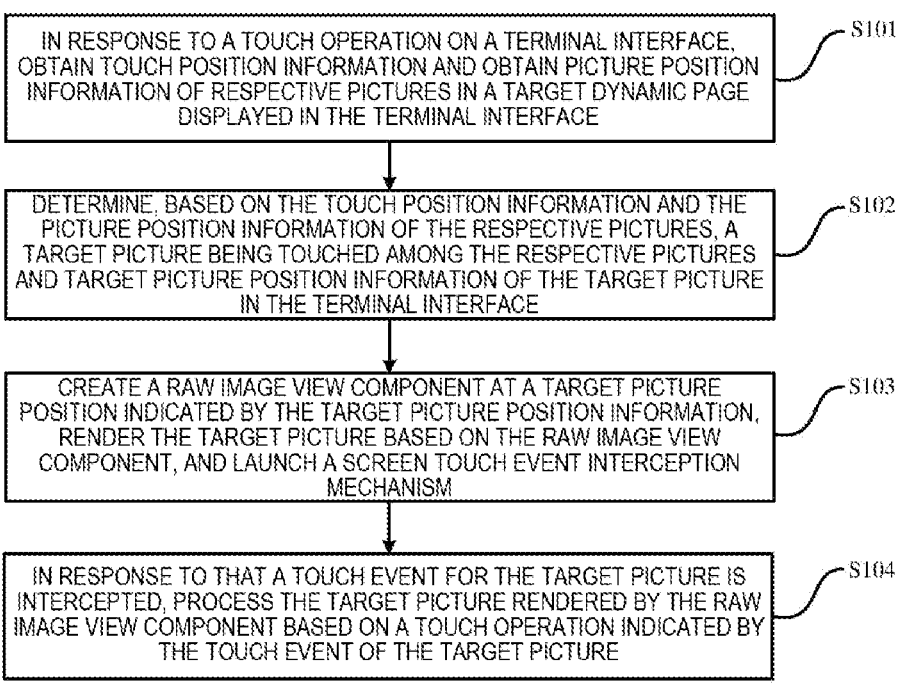

IN RESPONSE TO A TOUCH OPERATION ON A TERMINAL INTERFACE, OBTAIN TOUCH POSITION INFORMATION AND OBTAIN PICTURE POSITION INFORMATION OF RESPECTIVE PICTURES IN A TARGET DYNAMIC PAGE DISPLAYED IN THE TERMINAL INTERFACE — S101

DETERMINE, BASED ON THE TOUCH POSITION INFORMATION AND THE PICTURE POSITION INFORMATION OF THE RESPECTIVE PICTURES, A TARGET PICTURE BEING TOUCHED AMONG THE RESPECTIVE PICTURES AND TARGET PICTURE POSITION INFORMATION OF THE TARGET PICTURE IN THE TERMINAL INTERFACE — S102

CREATE A RAW IMAGE VIEW COMPONENT AT A TARGET PICTURE POSITION INDICATED BY THE TARGET PICTURE POSITION INFORMATION, RENDER THE TARGET PICTURE BASED ON THE RAW IMAGE VIEW COMPONENT, AND LAUNCH A SCREEN TOUCH EVENT INTERCEPTION MECHANISM — S103

IN RESPONSE TO THAT A TOUCH EVENT FOR THE TARGET PICTURE IS INTERCEPTED, PROCESS THE TARGET PICTURE RENDERED BY THE RAW IMAGE VIEW COMPONENT BASED ON A TOUCH OPERATION INDICATED BY THE TOUCH EVENT OF THE TARGET PICTURE — S104

FIG. 1

METHOD, APPARATUS, ELECTRONIC DEVICE AND READABLE STORAGE MEDIUM FOR PAGE PROCESSING

CROSS REFERENCE

The present application is based on and claims priority to Chinese Patent Application No. 202110796850.7, filed on Jul. 14, 2021 and entitled "method, apparatus, electronic device, and readable storage medium for page processing", the entirety of which is incorporated herein by reference.

FIELD

This disclosure relates to the field of information technology, specifically to a method, apparatus, electronic device, and readable storage medium for page processing.

BACKGROUND

With the development of Internet technology, contents displayed in a terminal page are increasingly diversified. In order to achieve dynamic display of contents, a dynamic web page based on hypertext markup language is usually used for content display.

At present, when zooming in on pictures in a dynamic web page, it is usually necessary to first click on the picture in the dynamic web page on the terminal interface. The terminal interface will jump to a page for viewing a large picture. Operating steps for gesture to enlarge the picture are then proceeded in the page for viewing the large picture.

The process of zooming in on pictures in the dynamic web page is cumbersome and inefficient.

SUMMARY

The present disclosure provides at least a method, apparatus, electronic device and readable storage medium for page processing.

In a first aspect, embodiments of the present disclosure provide a method for page processing, comprising:

in response to a touch operation on a terminal interface, obtaining touch position information and obtaining picture position information of respective pictures in a target dynamic page displayed in the terminal interface;

determining a target picture being touched among the respective pictures and target picture position information of the target picture in the terminal interface based on the touch position information and the picture position information of the respective pictures;

creating a raw image view component at a target picture position indicated by the target picture position information, rendering the target picture based on the raw image view component, and launching a screen touch event interception mechanism; and in response to that a touch event for the target picture is intercepted, processing the target picture rendered by the raw image view component based on a touch operation indicated by the touch event of the target picture.

In an optional implementation, determining a target picture being touched among the respective pictures and target picture position information of the target picture in the terminal interface based on the touch position information and the picture position information of the respective pictures comprises:

determining picture position information of the respective pictures in the terminal interface based on picture position information of respective pictures in the target dynamic page and a coordinate system conversion relationship between the target dynamic page and the terminal interface; and determining the target picture being touched among the respective pictures and the target picture position information of the target picture in the terminal interface based on the touch position information and the picture position information of the respective pictures in the terminal interface.

In an optional implementation, determining the target picture being touched among the respective pictures based on the touch position information and the picture position information of the respective pictures comprises:

in case where the touch position information indicating a plurality of touch position points, selecting, based on the picture position information of the respective pictures in the terminal interface, a picture from the respective pictures with a corresponding picture region comprising the plurality of touch position points as the target picture.

In an optional implementation, processing the target picture rendered by the raw image view component based on a touch operation indicated by the touch event of the target picture comprises:

determining scaling attribute information for the target picture based on the touch operation indicated by the touch event of the target picture, the scaling attribute information comprising a scaling ratio and a scaling direction; and updating the rendering of the target picture based on the raw image view component according to the scaling attribute information.

In an optional implementation, after determining the target picture being touched among the respective pictures and target picture position information of the target picture in the terminal interface based on the touch position information and the picture position information of the respective pictures, the method further comprises:

adding a placeholder picture matching a size of the target picture in the target dynamic page at the target picture position, the placeholder picture being located below the target picture rendered by the raw image view component and above the target picture in the target dynamic page.

In an optional implementation method, further comprising:

in response to detecting a cease of the touch operation, performing animation rendering on the target picture based on the raw image view component, to cause the target picture to be back to the target picture position and have the same size as the target picture in the target dynamic page.

In an optional implementation, before creating the raw image view component at the target picture position indicated by the target picture position information, rendering the target picture based on the raw image view component, and launching a screen touch event interception mechanism, the method further comprises:

determining, based on the touch position information, whether a plurality of touch position points is present on the terminal interface;

creating the raw image view component at the target picture position indicated by the target picture position information, and rendering the target picture based on the raw image view component, and launching the screen touch event interception mechanism comprises:

in accordance with a determination that the plurality of touch position points is present, creating the raw image view component at the target picture position indicated by the target picture position information, rendering the target picture based on the raw image view component, and launching the screen touch event interception mechanism.

In a second aspect, embodiments of the present disclosure also provide an apparatus for page processing, comprising:

an obtaining module configured to in response to a touch operation on a terminal interface, obtain touch position information and picture position information of respective pictures in a target dynamic page displayed in the terminal interface;

a determination module configured to determine, based on the touch position information and the picture position information of respective pictures, a target picture being touched among the respective pictures and target picture position information of the target picture in the terminal interface;

a rendering module configured to create a raw image view component at a target picture position indicated by the target picture position information, render the target picture based on the raw image view component, and launch a screen touch event interception mechanism; and a processing module configured to in response to that a touch event for the target picture is intercepted, process the target picture rendered by the raw image view component based on a touch operation indicated by a touch event of the target picture.

In a third aspect, embodiments of the present disclosure also provide a computer device, comprising: a processor, a memory and a bus, the memory storing machine-readable instructions executable by the processor, when the computer device is operating, the processor and the memory communicate via the bus, and the machine-readable instructions are executed by the processor to perform steps of the first aspect or steps of any possible implementations of the first aspect.

In a fourth aspect, embodiments of the present disclosure further provide a computer-readable storage medium having a computer program stored thereon, the computer program, when executed by a processor, performing steps of the first aspect or steps of any possible implementations of the first aspect.

According to a method, apparatus, electronic device and readable storage medium for page processing provided by the present disclosure, a raw image view component is created at the target picture position and the target picture is rendered based on the raw image view component. A touch event for the target picture is intercepted subsequently based on a screen interception event mechanism. Then a respective processing is performed on the target picture rendered by the raw image view component based on the touch operation indicated in the touch event of the target picture. The display effect of gesture scaling and dragging of the picture in the target dynamic page is achieved. The present disclosure does not need to click on the target picture in the target dynamic page to jump to the page for viewing large picture and then perform related operations of the picture. The scaling and dragging of the picture can be directly realized in the target picture rendered by the raw image view component, saving operation steps and improving interaction efficiency.

Further, according to the method for page processing provided by embodiments of the present disclosure, at the position of the target picture, add the target picture consistent with the size of the placeholder picture, wherein the placeholder picture is located below the target picture and positioned above the target picture. In response to the raw image view component rendering target picture is scaled and dragged, the placeholder picture may cover the target picture, to achieve the target picture appears to be touched object scaled, dragged, thereby improving the authenticity of the display effect.

In order to make the above objectives, features, and advantages of this disclosure more apparent and understandable, the following provides preferred embodiments, and provides a detailed explanation as follows in conjunction with the accompanying drawings.

BRIEF DESCRIPTION OF THE DRAWINGS

In order to more clearly illustrate technical solutions of the embodiments of the present disclosure, accompanying drawings that need to be used in the embodiments will be briefly introduced below. The drawings here are incorporated into the specification and constitute a part of this specification. These drawings illustrate the technical solutions that conform to the embodiments of the present disclosure and are used together with the specification to illustrate the technical solutions of the present disclosure. It should be understood that the following drawings only illustrate certain embodiments of the present disclosure and should not be regarded as limiting the scope. For those skilled in the art, without creative labor, other related drawings can be obtained based on these drawings.

FIG. 1 shows a flowchart of a method for page processing provided by embodiments of the present disclosure;

DETAILED DESCRIPTION

Figure 2:
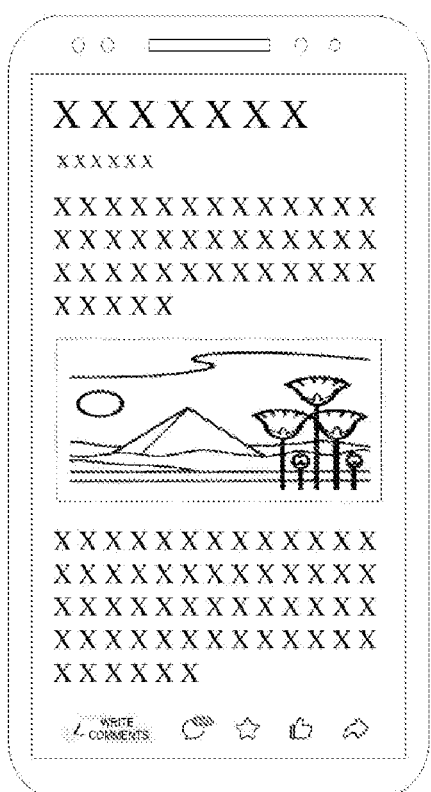
FIG. 2 shows a schematic view of a page effect before touch provided by embodiments of the present disclosure.

In order to make the purpose, technical solutions, and advantages of the embodiments of the present disclosure clearer, the technical solutions in the embodiments of the present disclosure will be described clearly and completely in conjunction with the accompanying drawings below. Apparently, the described embodiments are only part of the embodiments of the present disclosure, not all of them. The components of the embodiments of the present disclosure described and shown in the drawings can be arranged and designed in various configurations. Therefore, the following detailed description of the embodiments of the present disclosure provided in the drawings is not intended to limit the scope of the claimed disclosure, but only represents selected embodiments of the present disclosure. Based on the embodiments of the present disclosure, all other embodiments obtained by those skilled in the art without creative labor belong to the scope of protection of the present disclosure.

When zooming in on pictures in dynamic pages, it is usually necessary to first click on the pictures in the dynamic page displayed in the terminal interface, then jump to the view large picture page on the terminal interface, and finally perform gesture zooming and dragging operations on the view large picture page to achieve the purpose of viewing large pictures. The above operation steps for zooming in on pictures in dynamic pages are relatively cumbersome and have low interaction efficiency.

Based on the above research, the present disclosure provides a method for page processing, which creates a raw image view component at the target picture position and renders the target picture based on the raw image view component, intercepts touch events for the target picture based on the screen interception event mechanism, and then performs corresponding processing on the target picture rendered by the raw image view component according to the touch operation indicated in the touch event of the target picture. It realizes the display effect of gesture scaling and dragging of the picture in the target dynamic page. Embodiments of the present disclosure do not need to click on the target picture in the target dynamic page to jump to the view large picture page and then perform related operations on the picture. The scaling and dragging of picture may be directly realized in the target picture rendered by the raw image view component, saving operation steps and improving interaction efficiency.

The defects in the above solution are the results obtained by the inventor after practice and careful study. Therefore, the discovery process of the above problems and the solutions proposed by this disclosure for the above problems in the following text should be the contribution made by the inventor to this disclosure in the process of this disclosure.

It should be noted that similar numbers and letters represent similar items in the following figures, so once an item is defined in one figure, it does not need to be further defined and explained in subsequent figures.

In order to facilitate understanding of the present embodiment, a method for page processing disclosed in the present disclosure is first described in detail. The execution subject of the method for page processing provided in the present disclosure is generally a terminal device or other processing device with certain computing capability. The terminal device may be a user device (User Equipment, UE), a mobile device, a user terminal, a terminal, a cellular phone, a cordless phone, a personal digital assistant (Personal Digital Assistant, PDA), a handheld device, a computing device, a vehicle-mounted device, a wearable device, etc. In some possible implementations, the method for page processing may be implemented by a processor calling computer-readable instructions stored in a memory.

Below the execution subject as a terminal device will be described as an example of the method for page processing provided in embodiments of the present disclosure.

First of all, it should be noted that the method for page processing provided by the present disclosure is mainly applied to the scene where the user views the picture content in the dynamic page, and the target application program installed on the terminal device is started (the target application program includes dynamic pages, such as news information), and the content details page in the target application program is opened. When the content details page is a dynamic page, and the user wants to view the picture content contained in the content details page by touch operation, the method for page processing provided by embodiments of the present disclosure may be executed.

Referring to FIG. 1, a flowchart of a method for page processing according to embodiments of the present disclosure, the method comprising S101~S104, wherein:

S101: in response to a touch operation on a terminal interface, obtaining touch position information and obtaining picture position information of respective pictures in a target dynamic page displayed in the terminal interface.

The terminal interface may be a display interface in the touch screen on the terminal device. The target dynamic page may refer to a page that may achieve dynamic display of page content or structure, such as a webpage made based on Hyper Text Mark up Language 5 (HTML5), referred to as H5 webpage. It should be noted that the H5 webpage mentioned in the following text refers to a webpage made based on HTML5. H5 pages may be loaded through web view and displayed in the terminal interface.

Usually, the target dynamic page does not coincide with the terminal interface. This is because when the terminal interface displays the target dynamic page, other display areas of the terminal interface will also display some fixed page layout content rendered by raw components. For example, when the terminal device opens the news consultation content details page (H5 page loaded in web view), the terminal interface will also display article author information above the content details page, and user comment content will also be displayed below the content details page.

The target dynamic page may be translated in the up and down directions relative to the terminal interface, or in the left and right directions. By translating the target dynamic page, the content that is not displayed on the terminal interface in the target dynamic page can be displayed.

When the target dynamic page contains a large amount of contents, which occupies a long space and may not be fully displayed in the terminal interface, perform sliding operations or any other possible display operations on the target dynamic page. Only after partially or completely hiding the previously displayed contents can the un-displayed contents be displayed. When the contents contained in the target dynamic page are few, all of these contents may be displayed in the terminal interface, so there is no need to perform any operations on the target dynamic page.

After the terminal interface displays the target dynamic page, if there are pictures in the target dynamic page, the target script may first detect the position information of each picture in the target dynamic page. Each picture in the target dynamic page may be a picture that is currently all displayed in the terminal interface, a picture that is partially displayed in the terminal interface, or a picture that is not displayed in the terminal interface (un-displayed pictures may be displayed by panning the target dynamic page). The position information of the pictures refers to the position information of each picture in the target dynamic page.

The picture position information of the picture detected by the target script may include the offset of the upper and lower edges of the picture from the top of the target dynamic page, the offset of the left edge of the picture from the left side of the target dynamic page, and the offset of the right edge of the picture from the right side of the target dynamic page.

In order to facilitate the description of picture position information, a planar rectangular coordinate system may also be established in the target dynamic page. In one feasible implementation, a vertex of the target dynamic page may be used as the coordinate origin, and the straight lines where the two adjacent edges of the vertex (assuming the target dynamic page is a rectangle) are located are respectively the abscissa axis and the longitudinal coordinate axis to establish a planar rectangular coordinate system. The picture position information may be the coordinate information of the picture in the planar rectangular coordinate system, specifically the coordinate information of each vertex of the picture in the planar rectangular coordinate system. In other feasible implementation methods, a planar rectangular coordinate system may also be established with other points of the target dynamic page as the origin, which will not be repeated here.

After obtaining the picture position information of each picture in the target dynamic page, if a touch object (such as a user's finger) performs a touch operation on the terminal interface, the terminal device may detect the touch position and obtain the touch position information. The touch position information refers to the position information that contacts the terminal interface when the touch object touches the terminal interface.

Similarly, in order to facilitate the description of touch position information, a planar rectangular coordinate system may be established in the terminal interface, and then the touch position information in the planar rectangular coordinate system may be obtained. In a feasible implementation, a vertex of the terminal interface may be used as the origin, and the straight lines where the two adjacent edges of the vertex (assuming the terminal interface is a rectangle) are located are respectively the abscissa and ordinate axes to establish a planar rectangular coordinate system. The touch position information may be the coordinate information in the planar rectangular coordinate system. It should be noted that the touch position may be regarded as a point here, that is, the point where the touch object (such as the user's finger) is tangent to the terminal interface. When there are a plurality of touch positions, the coordinate information corresponding to each touch position may be obtained. In other feasible implementation methods, a planar rectangular coordinate system may also be established with other points of the terminal interface as the origin, which will not be repeated here.

In a feasible implementation, in order to facilitate the description of touch position information and picture position information, the vertex in the upper left corner of the terminal interface and the vertex in the upper left corner of the target dynamic page may be used as the origin (or vertices in other positions, but the vertex in the terminal interface as the origin should have the same relative position as the vertex in the target dynamic page in their respective planes). Two planar rectangular coordinate systems with the same coordinate axis direction are established, and then touch position information and picture position information is obtained respectively.

In the above embodiment, by establishing a plane rectangular coordinate system in the terminal interface and the target dynamic page, respectively, and then obtain touch position information and picture position information, respectively, the accuracy of the touch position information and picture position information is ensured thereby.

In one feasible implementation, a planar rectangular coordinate system may also be established in the terminal interface or target dynamic page, and then in this planar rectangular coordinate system, both touch position information and picture position information of each picture may be obtained. Although this implementation can describe both touch position information and picture position information at the same time, reducing the workload of processing position information, and quickly determining the target picture touched in each picture in step S102 (there is no need to convert the planar rectangular coordinate system established in the terminal interface to the planar rectangular coordinate system established in the target dynamic page), the premise of this implementation is that the terminal interface and the target dynamic page are completely coincident, and all pictures contained in the target dynamic page are displayed.

S102: a target picture being touched among the respective pictures and target picture position information of the target picture in the terminal interface are determined based on the touch position information and the picture position information of the respective pictures.

In the aforementioned steps, touch position information and picture position information of each picture has been obtained through the established plane rectangular coordinate system. Here, the target picture touched in each picture may be determined based on the touch position information and the picture position information of each picture.

For one possible embodiment described above, when the terminal interface completely coincides with the target dynamic page, and all pictures contained in the target dynamic page are displayed at the same time, the target picture touched in each picture may be determined directly in the plane rectangular coordinates established in the terminal interface or the target dynamic page based on the touch position information and the picture position information of each picture.

For the case where the terminal interface does not completely overlap with the target dynamic page, the plane rectangular coordinates established in the terminal interface may be converted into the plane rectangular coordinates established in the target dynamic page, that is, the touch position information and the picture position information of each picture may be converted into the same coordinate system, so as to have contrast, and based on the touch position information and the picture position information of each picture in the same coordinate system, the target picture touched in each picture may be determined.

In one possible implementation, the picture position information in the plane rectangular coordinates in the target dynamic page may be converted to the picture position information in the plane rectangular coordinate system in the terminal interface. Specifically, based on the picture position information in the target dynamic page and the coordinate system conversion relationship between the target dynamic page and the terminal interface, the picture position information of each picture in the terminal interface may be determined.

The coordinate system conversion relationship here may include the conversion relationship between the coordinate axes and the conversion relationship between the coordinate units (mainly considering that different terminal devices have different pixel densities, so the display size of the picture on different terminal interfaces may be different).

Specifically, the conversion relationship of the coordinate axis may be determined based on the relative position of the origin of the plane rectangular coordinate system in the target dynamic page and the origin of the plane rectangular coordinate system in the terminal interface, as well as the direction of the coordinate axis (in this disclosure, the direction of the coordinate axis of the plane rectangular coordinate system in the target dynamic page and the coordinate axis of the plane rectangular coordinate system in the terminal interface may be consistent). Then, according to the screen pixel density in the terminal interface, the conversion relationship of the coordinate unit is determined. Specifically, the coordinate unit of each picture in the target dynamic page returned by the script is multiplied by the screen pixel density in the terminal interface to obtain the coordinate unit of each picture displayed on the terminal interface.

After determining the picture position information of each picture in the terminal interface, the target picture touched in each picture and the target picture position information in the terminal interface may be determined based on the touch position information and the determined picture position information of each picture in the terminal interface.

In this disclosure, when the touch position points indicated by the touch position information are a plurality of touch position points, based on the picture position information of each picture in the terminal interface, a corresponding picture region containing a plurality of touch position points is selected as the target picture from each picture. That is, when there are a plurality of touch position points, the plurality of touch position points are all located in the picture region corresponding to the same picture, and the picture is used as the target picture.

In general, users need to use multi-finger operations when dragging/zooming pictures. Therefore, determining whether the current multi-finger operation is performed may be used as a prerequisite for executing the following steps (i.e., S103 below). Specifically, based on the touch position information, it is determined whether there is a plurality of touch position points in the picture region corresponding to the same picture. When there is one touch position point in the picture region corresponding to the same picture, it may detect whether it is a long press operation. If it is a long press operation, prompt information for downloading or sharing the picture may be displayed on the terminal interface. If it is not a long press operation, it may not respond to the current touch operation and consider it as a normal touch during the sliding process. When there is a plurality of touch position points in the picture region corresponding to the same picture, step S103 may be executed to achieve the effect of dragging/zooming.

S103: a raw image view component is created at a target picture position indicated by the target picture position information, the target picture is rendered based on the raw image view component, and a screen touch event interception mechanism is launched.

The raw image view component here may be a raw ImageView component. After determining the target picture, a raw image view component may be created at the target picture position indicated by the target picture position information. The raw image view component may load the picture address corresponding to the target picture and render the target picture. The target picture rendered by the raw image view component overlays the original picture position.

After the raw image view component renders the target picture, various touch operations of the touch object on the target picture may be intercepted by the screen touch event transfer mechanism of the terminal interface, and then applied to the raw image view component, that is, the process of S104.

S104: in response to that a touch event for the target picture is intercepted, the target picture rendered is processed by the raw image view component based on a touch operation indicated by the touch event of the target picture.

Here, the touch operation may be a scaling operation on the target picture. According to the touch operation indicated in the touch event of the target picture, scaling attribute information of the target picture may be determined; the scaling attribute information includes a scaling ratio and a scaling direction.

Specifically, changes in touch position information may be determined based on touch operations, and changes in touch position information may include changes in the distance between touch positions and changes in the relative direction of touch positions, which may be based on changes in touch position information.

Herein, the scaling ratio refers to the ratio between the target picture after scaling and before scaling; the scaling direction refers to the relative direction between the target picture after scaling and before scaling.

Figure 3:
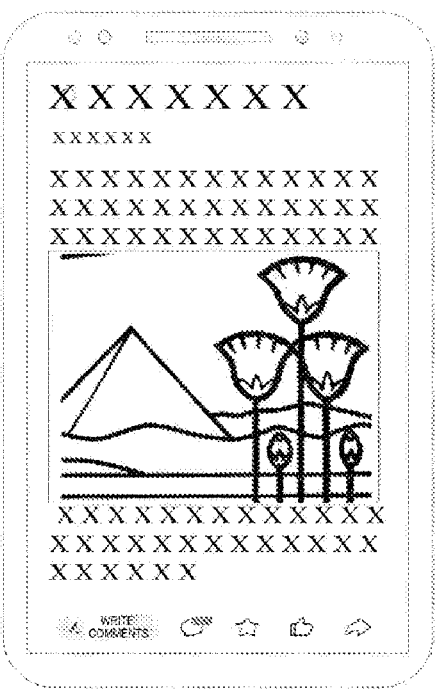
FIG. 3 shows a schematic view of a page effect after touch provided by embodiments of the present disclosure.

Then, according to the scaling attribute information, the target picture is rendered and updated based on the raw image view component to update the display attribute of the target picture. The display attribute of the target picture refers to the display size and/or display position information of the target picture. After determining the scaling attribute information, the display size and/or display position information of the target picture rendered by the raw image view component may be updated according to the scaling ratio and scaling direction. FIG. 2 shows a schematic diagram of the page effect before touch. FIG. 2 shows the target picture in the original target dynamic page. FIG. 3 shows a schematic diagram of the page effect after touch. Intercepting touch events for the target picture in the original target dynamic page, the target picture rendered by the raw image view component is enlarged, and the displayed effect looks like the target picture in the target dynamic page has been enlarged. The display size of the target picture and the content in the target picture are synchronously enlarged.

Considering that when the touch object performs a touch operation on the target picture rendered by the raw image view component, the target picture at the target picture position in the original target dynamic page is still present because it is always in the target dynamic page and may not be moved like the target picture rendered by the raw image view component that is being scaled and dragged by the touch object. In order to achieve the effect that the target picture in the original target dynamic page looks like it is scaled and dragged by the touched object, it is necessary to create a view component at the target picture position when the target picture rendered by the raw image view component is scaled and dragged, and use the view component to render a placeholder picture that is the same size as the target picture in the target dynamic page. The placeholder picture may be a gray picture and added below the target picture rendered by the raw image view component and above the target picture in the target dynamic page to ensure that the position and size of the placeholder picture may fully cover the target picture in the target dynamic page. When the touch object starts to touch the target picture rendered by the raw image view component, the placeholder picture is displayed. Since the target picture rendered by the raw image view component is directly above the target picture in the target dynamic page, as the touch position of the touch object changes, the display attribute of the target picture rendered by the raw image view component change in real time. At the same time, the target picture in the target dynamic page has been covered by the placeholder picture. The actual effect is as if the touch object drags the target picture in the target dynamic page and may be scaled.

When the touch operation is detected to cease, the target picture may be animated and rendered based on the raw image view component, so that the target picture rendered by the raw image view component is restored to the original picture position and consistent with the size of the original picture. That is, the target picture rendered by the raw image view component is moved from the position where the touch operation stopped to the position where the target picture in the target dynamic page is located, and the size of the target picture rendered by the raw image view component is restored to the size of the target picture in the target dynamic page. For example, the animation duration may be set to 200 ms. When the animation ends, that is, the target picture rendered by the raw image view component is restored to the target picture position in the target dynamic page, and is consistent with the size of the target picture in the target dynamic page, the target picture rendered by the raw image view component and the placeholder picture are deleted. At this time, the target picture in the target dynamic page is displayed on the terminal interface, but the actual visual effect is that the touch object scales, drags, and other actions are performed on the target dynamic page through touch operations, and the target picture in the target dynamic page will follow the touch object to physically move on the terminal interface. When the touch operation stops, the target picture in the target dynamic page is automatically restored. It should be noted that the raw image view component in this disclosure not only supports touch operations such as zooming and dragging, but also supports any touch interaction operation, such as clicking, double-clicking, long pressing, handwriting input, etc.

Figure 4:
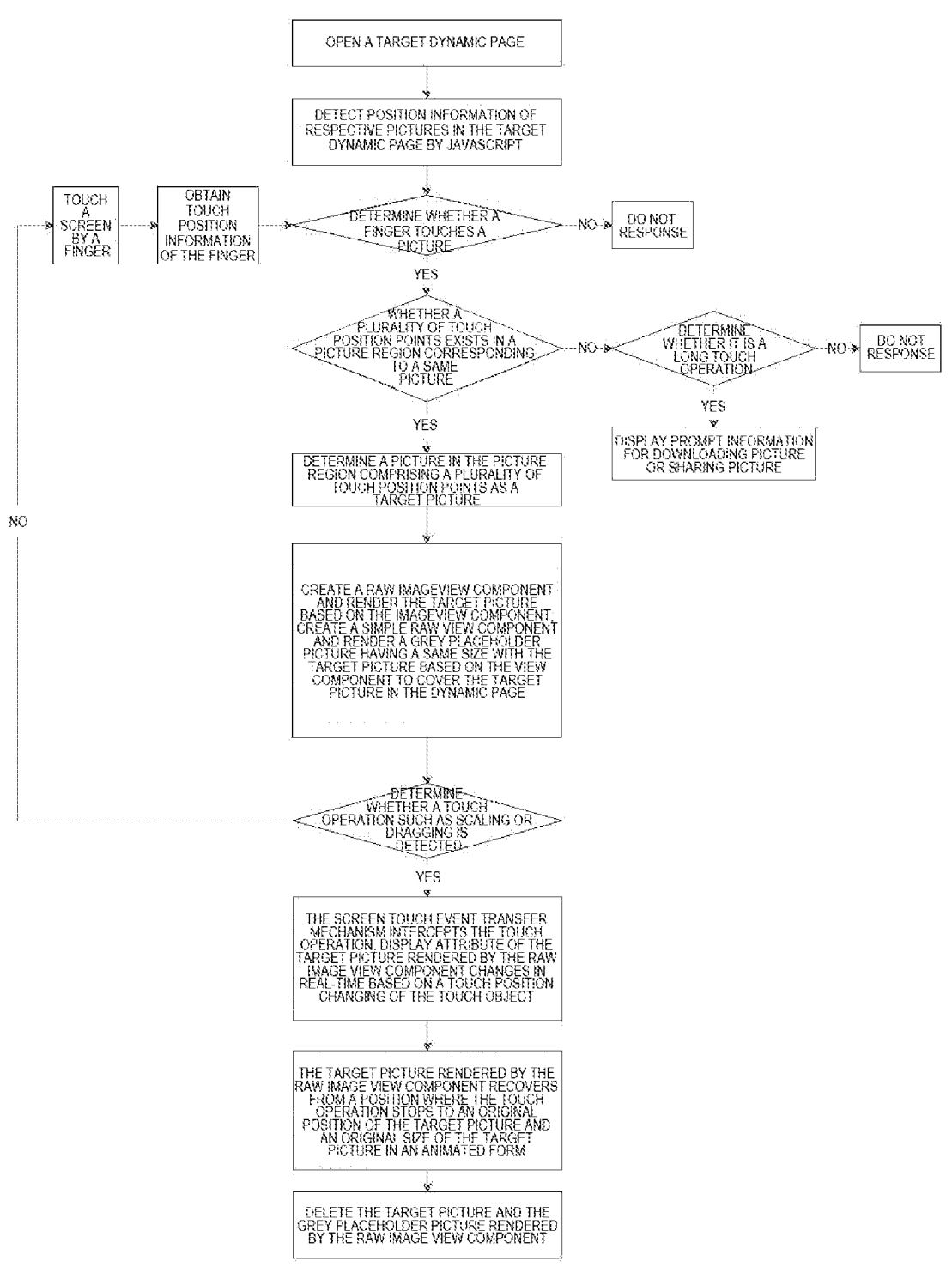
FIG. 4 shows a flowchart of another method for page processing provided by embodiments of the present disclosure.

In order to more clearly describe the method for page processing provided in embodiments of the present disclosure, FIG. 4 shows a flowchart of a specific process for page processing. As shown, after initiating a target application installed on the terminal device and open a target dynamic page of the target application, respective pictures in the target dynamic page may be displayed on the terminal device. Java script (javascript) may detect the position information of each picture in the target dynamic page.

When a finger performs a touch operation on the terminal interface, the touch position information of each finger on the terminal interface may be obtained in response to the touch operation acting on the terminal interface. Then, it is determined whether a finger touches the picture based on the touch position information of each finger and the picture position information of each picture. If the finger touches the picture, it is further determined whether there are a plurality of touch position points in the picture region corresponding to the same picture. If there is one touch position point in the picture region corresponding to the same picture, it may detect whether it is a long press operation. If it is a long press operation, it may display prompt information to download or share the picture on the terminal interface. If it is not a long press operation, it may not respond to the current touch operation and be considered as a touch during the ordinary sliding process. When there are a plurality of touch position points in the picture region corresponding to the same picture, the picture region may contain a plurality of touch position points as the target picture.

Then, a raw ImageView component may be created at the target picture position indicated by the target picture position information, and the target picture may be rendered based on the ImageView component. Each touch operation of the finger on the target picture may be intercepted by the screen touch event transfer mechanism and then applied to the raw image view component.

A simple raw view component may also be created and a gray placeholder picture that matches the size of the target picture may be rendered based on the view component. The gray placeholder picture is added below the target picture rendered by the raw image view component and above the target picture in the target dynamic page, ensuring that the position and size of the placeholder picture can fully cover the target picture in the target dynamic page.

Next, whether scaling and dragging operations have been performed on the screen is determined. If scaling and dragging operations have not been performed on the screen, it may do not respond and continue to monitor whether a finger touches the picture. When the finger performs scaling and dragging operations, as the touch position of the touch object changes, the display attribute of the target picture rendered by the raw image view component change in real time. At the same time, the target picture in the target dynamic page is covered by the placeholder picture, and the actual effect is as if the touch object drags and scales the target picture in the target dynamic page.

When the finger stops the touch operation, the target picture rendered by the raw image view component is restored from the position where the touch operation stopped to the position where the original target picture is located through animation, and is consistent with the size of the original picture. Finally, the target picture rendered by the raw image view component and the placeholder picture are deleted. At this time, the target picture in the target dynamic page is redisplayed in the terminal interface.

Those skilled in the art will appreciate, in the above methods of the detailed description, the writing order of each step does not mean a strict execution order and constitute any limitation on the implementation process, the specific execution order of each step should be determined by its function and possible internal logic.

Based on the same inventive concept, embodiments of the present disclosure also provide an apparatus for page processing corresponding to the method for page processing, since the principle of the present disclosure apparatus to solve the problem with the above-described embodiment of the method for page processing disclosed in the present embodiment is similar, and therefore embodiment of the apparatus may refer to the method implementation, repetition will not be repeated.

Figure 5:
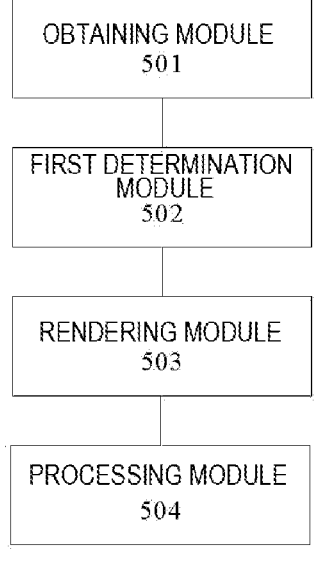
FIG. 5 shows a schematic diagram of an apparatus for page processing provided by embodiments of the present disclosure.

Referring to FIG. 5, a schematic diagram of the architecture of an apparatus for page processing according to embodiments of the present disclosure, the apparatus comprising: an obtaining module 501, a first determination module 502, a rendering module 503, a processing module 504; wherein, the obtaining module 501 configured to in response to a touch operation on a terminal interface, obtain touch position information and obtain picture position information of respective pictures in a target dynamic page displayed in the terminal interface; the first determination module 502 configured to determine a target picture being touched among the respective pictures and target picture position information of the target picture in the terminal interface based on the touch position information and the picture position information of the respective pictures;

the rendering module 503 create a raw image view component at a target picture position indicated by the target picture position information, render the target picture based on the raw image view component, and launch a screen touch event interception mechanism; and the processing module 504 configured to in response to that a touch event for the target picture is intercepted, process the target picture rendered by the raw image view component based on a touch operation indicated by a touch event of the target picture.

Embodiments of the present disclose creates a raw image view component at the target picture position and renders the target picture based on the raw image view component, processes the target picture rendered by the raw image view component by the touch operation indicated in the touch event, without clicking on the target dynamic page of the target picture jump to view the large picture page and then perform related operations of the picture. Viewing operations such as scaling, dragging or the like to the picture may be achieved in the target dynamic page directly, which saves the operation steps and improves the interaction efficiency.

In one possible embodiment, the first determination module 502 is specifically configured to: determine picture position information of the respective pictures in the terminal interface based on picture position information of respective pictures in the target dynamic page and a coordinate system conversion relationship between the target dynamic page and the terminal interface; and determine the target picture being touched among the respective pictures and the target picture position information of the target picture in the terminal interface based on the touch position information and the picture position information of the respective pictures in the terminal interface.

In one possible embodiment, the first determination module 502, specifically configured to: in case where the touch position information indicating a plurality of touch position points, select, based on the picture position information of the respective pictures in the terminal interface, a picture from the respective pictures with a corresponding picture region comprising the plurality of touch position points as the target picture.

In one possible implementation, the processing module 504 is specifically configured to determine scaling attribute information for the target picture based on the touch operation indicated by the touch event of the target picture, the scaling attribute information comprising a scaling ratio and a scaling direction; and update the rendering of the target picture based on the raw image view component according to the scaling attribute information.

One possible implementation further includes: an addition module configured for adding a placeholder picture matching a size of the target picture in the target dynamic page at the target picture position, the placeholder picture being located below the target picture rendered by the raw image view component and above the target picture in the target dynamic page.

In one possible implementation, the processing module 504 is specifically configured for in response to detecting a cease of the touch operation, performing animation rendering on the target picture based on the raw image view component, to cause the target picture to be back to the target picture position and have the same size as the target picture in the target dynamic page.

A possible implementation further includes: a second determination module configured for determining, based on the touch position information, whether a plurality of touch position points are present on the terminal interface;

the rendering module 503 is specifically configured for in accordance with a determination that the plurality of touch position points are present, creating the raw image view component at the target picture position indicated by the target picture position information, rendering the target picture based on the raw image view component, and launching the screen touch event interception mechanism.

Description of the processing flow of each module in the apparatus, and the interaction flow between the modules may refer to the relevant description of the above method embodiments, not described in detail here.

Figure 6:
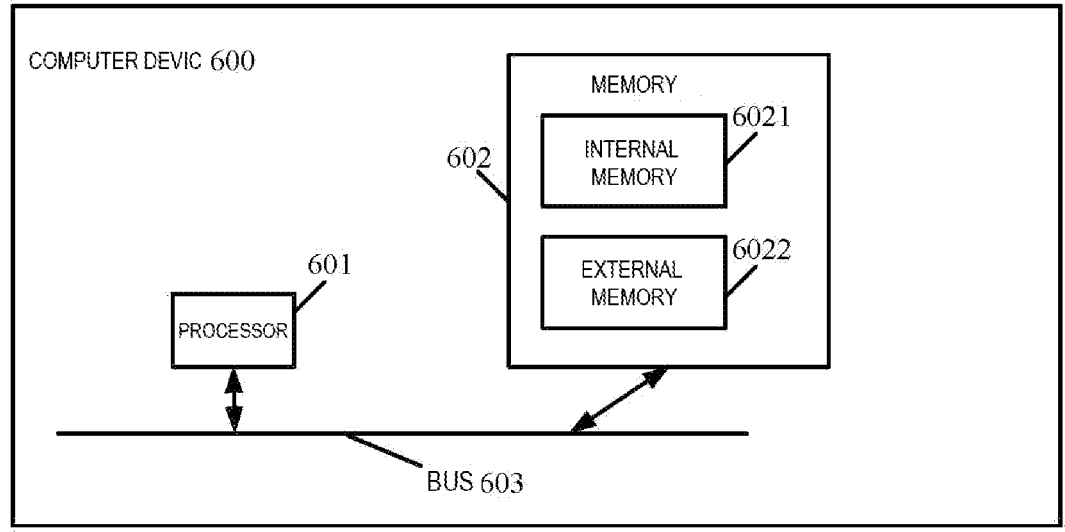
FIG. 6 shows a schematic diagram of a computer device provided by embodiments of the present disclosure.

Based on the same technical concept, the embodiments of the present disclosure also provide a computer device. Referring to FIG. 6, a structural schematic diagram of the computer device 600 provided in the embodiments of the present disclosure includes a processor 601, a memory 602, and a bus 603. The memory 602 is configured to store execution instructions, including internal memory 6021 and external memory 6022. Here, the internal memory 6021, also known as internal memory, is configured to temporarily store arithmetic data in the processor 601 and data exchanged with external memory 6022 such as a hard disk. The processor 601 exchanges data with the external memory 6022 through the internal memory 6021. When the computer device 600 is running, the processor 601 communicates with the memory 602 through the bus 603, causing the processor 601 to execute the following instructions:

in response to a touch operation on a terminal interface, obtaining touch position information and obtaining picture position information of respective pictures in a target dynamic page displayed in the terminal interface;

determining a target picture being touched among the respective pictures and target picture position information of the target picture in the terminal interface based on the touch position information and the picture position information of the respective pictures;

creating a raw image view component at a target picture position indicated by the target picture position information, rendering the target picture based on the raw image view component, and launching a screen touch event interception mechanism; and in response to that a touch event for the target picture is intercepted, processing the target picture rendered by the raw image view component based on a touch operation indicated by the touch event of the target picture.

Embodiments of the present disclosure further provide a computer readable storage medium having a computer program stored thereon, that, when executed by a processor, performs steps of the method of page processing described in the above embodiments. Herein, the storage medium may be a volatile or non-volatile computer readable storage medium.

Embodiments of the present disclosure further provide a computer program, the computer program including program code, the program code including instructions may be used to perform the steps of the method of page processing described in the above embodiments. The above-described method embodiments may be referred for details and will not be described herein again.

Embodiments of the present disclosure further provide a computer program product, the computer product carries program code, and the program code including instructions may be used to perform the steps of the method of page processing described in the above embodiments. The above-described method embodiments may be referred for details and will not be described herein again.

Herein, the computer program product described above may be implemented in hardware, software, or a combination thereof. In an optional embodiment, the computer program product is implemented as a computer storage medium, and in another optional embodiment, the computer program product is implemented as a software product, such as a Software Development Kit (SDK) and the like.

Those skilled in the art may clearly understand that for the convenience and brevity of description, the specific working process of the system and apparatus described above may refer to the corresponding process in the aforementioned method embodiments, which will not be repeated here. In several embodiments provided in this disclosure, it should be understood that the disclosed system, apparatus, and method may be implemented in other ways. The apparatus embodiments described above are only illustrative. For example, the division of the unit is only a logical function division, and there may be other division methods in actual implementation. For another example, a plurality of units or components may be combined or integrated into another system, or some features may be ignored or not executed. Another point is that the coupling or direct coupling or communication connection between the displayed or discussed apparatuses or units may be indirectly coupled or connected through some communication interfaces, apparatuses, or units, which may be electrical, mechanical, or other forms.

The units described as separate components may or may not be physically separated, and the components displayed as units may or may not be physical units, that is, they may be located in one place or may be distributed to a plurality of network units. Some or all of the units may be selected according to actual needs to achieve the purpose of the embodiments of the present disclosure.

Further, the functional units in various embodiments of the present disclosure may be integrated in one processing unit, each unit may be physically present alone, may be two or more units integrated in one unit.

If the function is implemented in the form of a software functional unit and sold or used as an independent product, it may be stored in a non-volatile computer-readable storage medium executable by a processor. Based on this understanding, the technical solution of the present disclosure may be embodied in the form of a software product, which is stored in a storage medium and includes several instructions to make a computer device (which may be a personal computer, a server, or a network device, etc.) perform all or part of the steps of the methods described in each embodiment of the present disclosure. The aforementioned storage medium include: U disk, mobile hard disk, Read-Only Memory (ROM), Random Access Memory (RAM), magnetic disk or optical disk, and other medium that may store program code.

Finally, it should be noted that: the above embodiments are only a detailed implementation of the present disclosure, to illustrate the technical solution of the present disclosure, rather than limiting it, the scope of protection of the present disclosure is not limited thereto, although with reference to the foregoing embodiments of the present disclosure has been described in detail, those skilled in the art should understand that: any person skilled in the art in the field within the technical scope of the present disclosure may still modify or easily think of changes to the technical solutions described in the foregoing embodiments, or equivalently replace some of the technical features; and these modifications, changes or substitutions, does not make the essence of the corresponding technical solutions from the spirit and scope of embodiments of the present disclosure, and should be covered within the scope of the present disclosure. Therefore, the scope of the present disclosure should be subject to the scope of the claims.

What is claimed is:

1. A method for page processing, comprising:
in response to a touch operation on a terminal interface, obtaining touch position information and obtaining picture position information of respective pictures in a target dynamic page displayed in the terminal interface;
determining a target picture being touched among the respective pictures and target picture position information of the target picture in the terminal interface based on the touch position information and the picture position information of the respective pictures;
creating a raw image view component at a target picture position indicated by the target picture position information, rendering the target picture based on the raw image view component, and launching a screen touch event interception mechanism; and
in response to that a touch event for the target picture is intercepted, processing the target picture rendered by the raw image view component based on a touch operation indicated by the touch event of the target picture.

2. The method of claim 1, wherein determining a target picture being touched among the respective pictures and target picture position information of the target picture in the terminal interface based on the touch position information and the picture position information of the respective pictures comprises:
determining picture position information of the respective pictures in the terminal interface based on picture position information of respective pictures in the target dynamic page and a coordinate system conversion relationship between the target dynamic page and the terminal interface; and
determining the target picture being touched among the respective pictures and the target picture position information of the target picture in the terminal interface based on the touch position information and the picture position information of the respective pictures in the terminal interface.

3. The method of claim 2, wherein determining the target picture being touched among the respective pictures based on the touch position information and the picture position information of the respective pictures comprises:
in case where the touch position information indicating a plurality of touch position points, selecting, based on the picture position information of the respective pictures in the terminal interface, a picture from the respective pictures with a corresponding picture region comprising the plurality of touch position points as the target picture.

4. The method of claim 1, wherein processing the target picture rendered by the raw image view component based on a touch operation indicated by the touch event of the target picture comprises:
determining scaling attribute information for the target picture based on the touch operation indicated by the touch event of the target picture, the scaling attribute information comprising a scaling ratio and a scaling direction; and
updating the rendering of the target picture based on the raw image view component according to the scaling attribute information.

5. The method of claim 1, wherein after determining the target picture being touched among the respective pictures and target picture position information of the target picture in the terminal interface based on the touch position information and the picture position information of the respective pictures, the method further comprises:

adding a placeholder picture matching a size of the target picture in the target dynamic page at the target picture position, the placeholder picture being located below the target picture rendered by the raw image view component and above the target picture in the target dynamic page.

6. The method of claim 1, further comprising:

in response to detecting a cease of the touch operation, performing animation rendering on the target picture based on the raw image view component, to cause the target picture to be back to the target picture position and have the same size as the target picture in the target dynamic page.

7. The method of claim 1, wherein before creating the raw image view component at the target picture position indicated by the target picture position information, rendering the target picture based on the raw image view component, and launching a screen touch event interception mechanism, the method further comprises:

determining, based on the touch position information, whether a plurality of touch position points is present on the terminal interface, creating the raw image view component at the target picture position indicated by the target picture position information, and rendering the target picture based on the raw image view component, and launching the screen touch event interception mechanism comprises:

in accordance with a determination that the plurality of touch position points is present, creating the raw image view component at the target picture position indicated by the target picture position information, rendering the target picture based on the raw image view component, and launching the screen touch event interception mechanism.

8. A computer device, comprising: a processor, a memory and a bus, the memory storing machine-readable instructions executable by the processor, when the computer device is operating, the processor and the memory communicate via the bus, and the machine-readable instructions are executed by the processor to perform steps of a method for page processing, comprising:

in response to a touch operation on a terminal interface, obtaining touch position information and obtaining picture position information of respective pictures in a target dynamic page displayed in the terminal interface;

determining a target picture being touched among the respective pictures and target picture position information of the target picture in the terminal interface based on the touch position information and the picture position information of the respective pictures;

creating a raw image view component at a target picture position indicated by the target picture position information, rendering the target picture based on the raw image view component, and launching a screen touch event interception mechanism; and in response to that a touch event for the target picture is intercepted, processing the target picture rendered by the raw image view component based on a touch operation indicated by the touch event of the target picture.

9. The computer device of claim 8, wherein determining a target picture being touched among the respective pictures and target picture position information of the target picture in the terminal interface based on the touch position information and the picture position information of the respective pictures comprises:

determining picture position information of the respective pictures in the terminal interface based on picture position information of respective pictures in the target dynamic page and a coordinate system conversion relationship between the target dynamic page and the terminal interface; and determining the target picture being touched among the respective pictures and the target picture position information of the target picture in the terminal interface based on the touch position information and the picture position information of the respective pictures in the terminal interface.

10. The computer device of claim 9, wherein determining the target picture being touched among the respective pictures based on the touch position information and the picture position information of the respective pictures comprises:

in case where the touch position information indicating a plurality of touch position points, selecting, based on the picture position information of the respective pictures in the terminal interface, a picture from the respective pictures with a corresponding picture region comprising the plurality of touch position points as the target picture.

11. The computer device of claim 8, wherein processing the target picture rendered by the raw image view component based on a touch operation indicated by the touch event of the target picture comprises:

determining scaling attribute information for the target picture based on the touch operation indicated by the touch event of the target picture, the scaling attribute information comprising a scaling ratio and a scaling direction; and updating the rendering of the target picture based on the raw image view component according to the scaling attribute information.

12. The computer device of claim 8, wherein after determining the target picture being touched among the respective pictures and target picture position information of the target picture in the terminal interface based on the touch position information and the picture position information of the respective pictures, the steps further comprises:

adding a placeholder picture matching a size of the target picture in the target dynamic page at the target picture position, the placeholder picture being located below the target picture rendered by the raw image view component and above the target picture in the target dynamic page.

13. The computer device of claim 8, wherein the steps further comprises:

in response to detecting a cease of the touch operation, performing animation rendering on the target picture based on the raw image view component, to cause the target picture to be back to the target picture position and have the same size as the target picture in the target dynamic page.

14. The computer device of claim 8, wherein before creating the raw image view component at the target picture position indicated by the target picture position information, rendering the target picture based on the raw image view component, and launching a screen touch event interception mechanism, the steps further comprises:

determining, based on the touch position information, whether a plurality of touch position points is present on the terminal interface, creating the raw image view component at the target picture position indicated by the target picture position information, and rendering the target picture based on the raw image view component, and launching the screen touch event interception mechanism comprises:

in accordance with a determination that the plurality of touch position points is present, creating the raw image view component at the target picture position indicated by the target picture position information, rendering the target picture based on the raw image view component, and launching the screen touch event interception mechanism.

15. A non-transitory computer-readable storage medium having a computer program stored thereon, the computer program, when executed by a processor, performing steps of a method for page processing, comprising:

in response to a touch operation on a terminal interface, obtaining touch position information and obtaining picture position information of respective pictures in a target dynamic page displayed in the terminal interface;

determining a target picture being touched among the respective pictures and target picture position information of the target picture in the terminal interface based on the touch position information and the picture position information of the respective pictures;

creating a raw image view component at a target picture position indicated by the target picture position information, rendering the target picture based on the raw image view component, and launching a screen touch event interception mechanism; and in response to that a touch event for the target picture is intercepted, processing the target picture rendered by the raw image view component based on a touch operation indicated by the touch event of the target picture.

16. The computer-readable storage medium of claim 15, wherein determining a target picture being touched among the respective pictures and target picture position information of the target picture in the terminal interface based on the touch position information and the picture position information of the respective pictures comprises:

determining picture position information of the respective pictures in the terminal interface based on picture position information of respective pictures in the target dynamic page and a coordinate system conversion relationship between the target dynamic page and the terminal interface; and determining the target picture being touched among the respective pictures and the target picture position information of the target picture in the terminal interface based on the touch position information and the picture position information of the respective pictures in the terminal interface.

17. The computer-readable storage medium of claim 16, wherein determining the target picture being touched among the respective pictures based on the touch position information and the picture position information of the respective pictures comprises:

in case where the touch position information indicating a plurality of touch position points, selecting, based on the picture position information of the respective pictures in the terminal interface, a picture from the respective pictures with a corresponding picture region comprising the plurality of touch position points as the target picture.

18. The computer-readable storage medium of claim 15, wherein processing the target picture rendered by the raw image view component based on a touch operation indicated by the touch event of the target picture comprises:

determining scaling attribute information for the target picture based on the touch operation indicated by the touch event of the target picture, the scaling attribute information comprising a scaling ratio and a scaling direction; and updating the rendering of the target picture based on the raw image view component according to the scaling attribute information.

19. The computer-readable storage medium of claim 15, wherein after determining the target picture being touched among the respective pictures and target picture position information of the target picture in the terminal interface based on the touch position information and the picture position information of the respective pictures, the steps further comprises:

adding a placeholder picture matching a size of the target picture in the target dynamic page at the target picture position, the placeholder picture being located below the target picture rendered by the raw image view component and above the target picture in the target dynamic page.

20. The computer-readable storage medium of claim 15, wherein the steps further comprises:

in response to detecting a cease of the touch operation, performing animation rendering on the target picture based on the raw image view component, to cause the target picture to be back to the target picture position and have the same size as the target picture in the target dynamic page.

* * * * *